March 3, 1964 R. H. REDFIELD ETAL 3,122,847
ELECTRONIC TEACHING DEVICE
Filed June 27, 1961 7 Sheets-Sheet 3

Fig. 3.

INVENTORS.
Robert H. Redfield
Wayne Maynard Collander
By Robert L. Slater, Jr.
Atty.

Fig. 6.

United States Patent Office 3,122,847
Patented Mar. 3, 1964

3,122,847
ELECTRONIC TEACHING DEVICE
Robert H. Redfield, 609 N. Elmwood Ave., Evanston, Ill., and Wayne Maynard Collander, 922 North Blvd., Oak Park, Ill.
Filed June 27, 1961, Ser. No. 119,979
9 Claims. (Cl. 35—35)

The present invention relates to electronic teaching aids, and more specifically to classroom teaching aids adapted particularly to foreign language classroom instruction.

The effectiveness and over-all efficiency of classroom instruction in foreign language courses and other subject matter which require repetitious presentation to the student can be heightened by employing electronic means with which the student can, on an individual basis, listen to expert speakers, engage in individual practice drill, listen by means of recorded playback to his own spoken words, compare his efforts with those of an expert or native language speaker and, finally, provide means for monitoring of the student's spoken words by the instructor. Electronic and electro-mechanical devices for accomplishing some or all of these functions have been known and used for some period of time. However, all of the previously disclosed teaching devices of the variety discussed herein are limited in their flexibility of function and are bulky devices which frequently require alterations to the classrooms where they are employed.

One variety of electronic teaching aid of the class to which the present invention belongs utilizes a multiple lead cable which connects the instructor's console to each student station. The cable must be installed within a permanent conduit provided in the floor of the classroom where the device is to be used. Separate permanent soundproof stalls erected about each student desk are required for optimum use of some of these earlier devices.

Accordingly, the alterations to a classroom for using the previously disclosed inventions are very costly and render the classroom unsatisfactory for alternative uses. Moreover, such permanently installed teaching aids as have been disclosed earlier are disadvantageous because they lack mobility, are severely limited as to the number of student stations which they can accommodate, create problems of classroom ventilation, increase the problems of the instructor's control over the student, and, finally, they are very poorly adaptable for use in alternative uses, such as drama and speech classes.

It, therefore, is one object of our invention to provide an electronic language teaching aid which is mobile and requires no special permanent installations or alterations to a classroom in which it is to be used.

It is another object of our invention to provide an electronic teaching aid which is readily adaptable to instruction in drama, speech and other disciplines as well as foreign languages.

It is another object of our invention to provide an electronic teaching aid wherein the number of student stations may be substantially increased without alteration of the apparatus.

It is still another object of the present invention to provide an electronic teaching aid wherewith the student stations and the instructor's console may be positioned within a classroom in any physical relationship and the student stations may even be conveniently moved about during the course of the instruction.

These and other objects and advantages of our invention will be apparent from the following description, specification and accompanying drawings.

Our invention is, briefly, an improved electronic teaching aid comprising the combination of a plurality of self-powered student stations linked by radio means with an instructor's console. Preferred specific embodiments of our invention are described herein and illustrated in the accompanying drawings. Each of the three specific embodiments and variations on these embodiments, illustrated and described below, possesses particular advantages for a given application depending upon the age level of the students who use the device, the availability of radio frequency channels, and the size of the classes for which the device is intended.

Our invention is further illustrated in the accompanying drawings in which.

Figure 1:
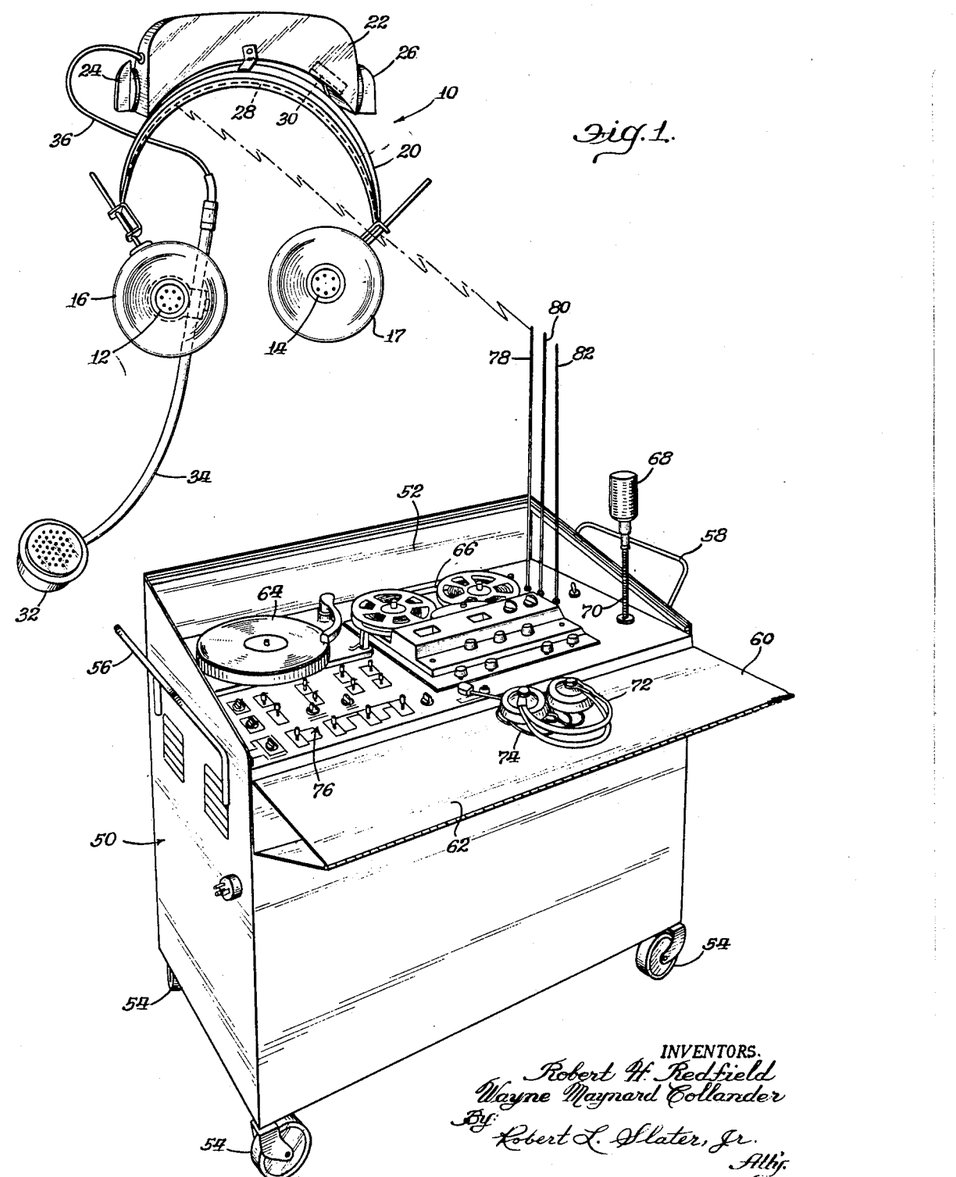
FIGURE 1 is a perspective view of one embodiment of our invention showing views of an instructor's console and a view of one student station.
Figure 2:
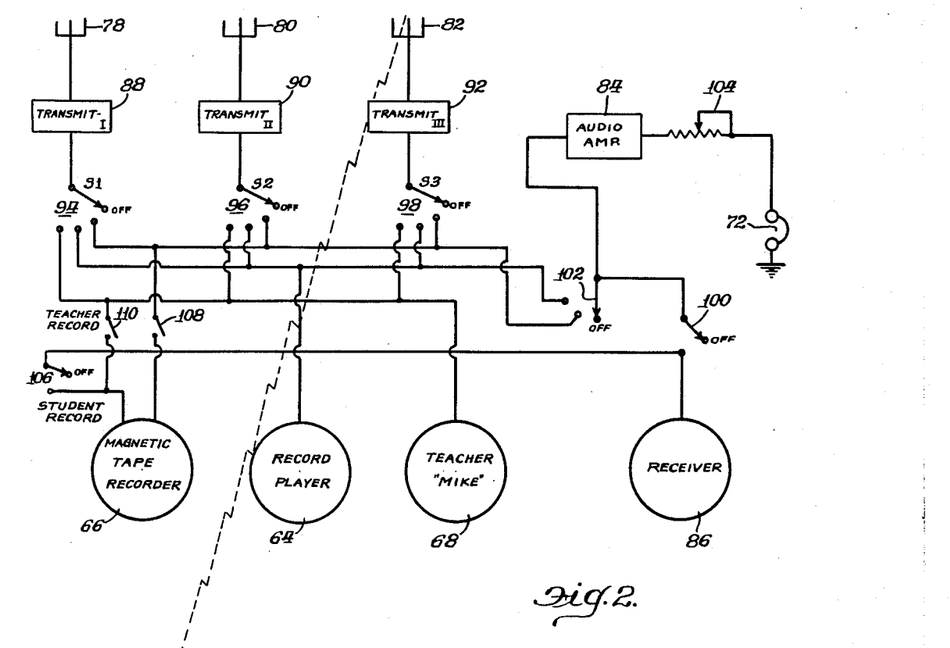
FIGURE 2 is a block diagram of the embodiment of our invention adapted for utilizing three radio frequency channels such as illustrated in FIGURE 1. The component connections and switching for the instructor's console and the component connections and switching for only one student station are illustrated.
Figure 3:
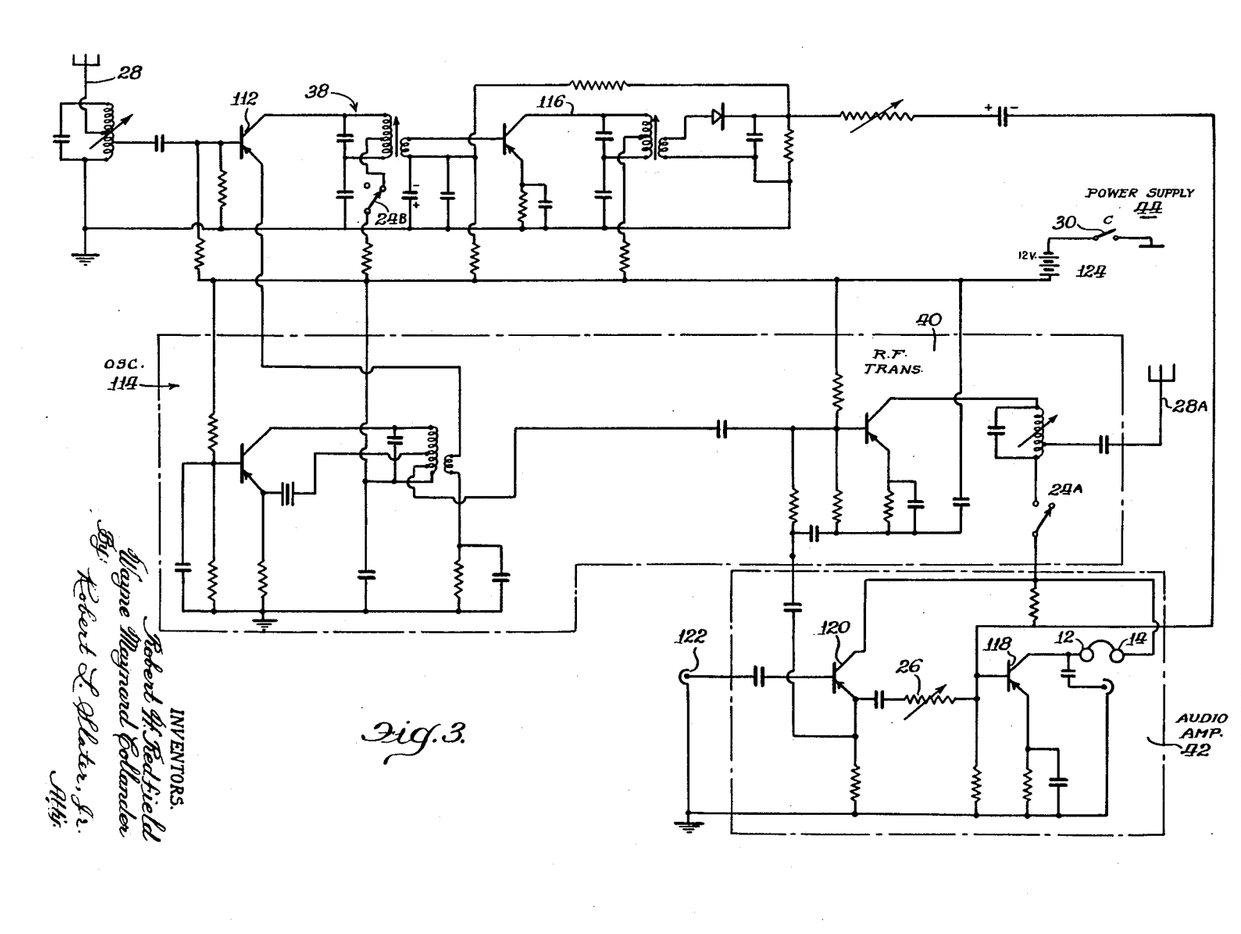
FIGURE 3 is a circuit diagram illustrating a typical student station circuit for the embodiment of our invention illustrated in FIGURES 1 and 2.

Referring now to the drawings, FIGURES 1, 2 and 3 are, respectively, a perspective view of a preferred embodiment of our invention illustrating both the instructor's console and one student station, the system being adapted to operate on three radio frequency channels; a block diagram of the three channel embodiments; and a circuit diagram of the student's station adapted to the three radio channel system.

The student station comprises a battery operated headset 10 comprised of two earphones 12 and 14, each of which are mounted within sponge rubber sound isolators 16 and 17. The earphones 12 and 14 are mounted on a spring headband 20. A light weight case 22 is mounted symmetrically on the spring headband. The case 22 contains a radio receiver, a low power radio transmitter, an audio frequency amplifier, all described below, and two control means actuated by nobs 24 and 26 which may be conveniently mounted on the ends of the case 22 immediately above the earphones 12 and 14, as shown in the drawings. An antenna 28, shown in broken line, is embedded in the headband 20. An on-and-off switch 30, of the microswitch-toggle variety, is mounted within the case 22 but positioned so that the toggle switch is actuated when the spring headband is expanded and flattens as the earphones are placed on a user's head, and similarly actuated when the headband 20 is expanded and flattens when the earphones are being removed from the user's head. It is convenient to insert the on-off switch 30 in the power supply circuit as shown in FIGURE 2.

A microphone 32 is mounted on a short adjustable boom 34 which in turn may be mounted to a bracket (not shown) on one of the earphones 12. The microphone is connected by a cable 36 to the interior of the case 22.

The case 22, the contents of which are best understood by reference to FIGURE 2, contains a radio receiver 38, a radio transmitter 40, an audio amplifier 42, the variable resistance 26 utilized as a volume control for the earphones 12 and 14, a battery operated power supply 44, the double-pole two-position selector switch 24, and an antenna 28. The power supply 44 is connected by appropriate electrical leads through the toggle switch 30 to the receiver 38, the transmitter 40, and the audio amplifier 42. The audio amplifier 42 has two input sources, the microphone 32 and the receiver 38. In the audio amplifier the output is branched, one branch leading to the earphones 12 and 14 and the other branch leading to the input stage of the transmitter 40. The student's earphones 12 and 14 are always connected to the audio amplifier; by means of the double-pole selector switch 24, the student may select to transmit his own voice picked up by the microphone 32 or he may select to listen to radio signals picked up by his receiver 38. The selector switch 24 is adapted to switch the antenna circuit 28 from the input end of the receiver to the output end of the transmitter, and simultaneously and respectively on the parallel pole, switch from disconnect to connection of the lead between the output of the audio amplifier and the input of the transmitter. A more detailed specification of preferred circuits employed in the various subassemblies described above in the student's station is presented below.

The instructor's console indicated at 50 comprises a cabinet 52 which is conveniently adapted to roll on casters 54, as shown in the drawing, or may be adapted to a stationary desk design. The cabinet 52 is provided with handles 56 and 58 by which the entire cabinet may be readily carried by two persons. The cabinet 52 is provided with a cover section 60 which folds and extends outward from the cabinet proper to form a desk height ledge 62 for the convenience of the instructor while operating the console. In the lower portion of the cabinet 52 provision is made for storing and transporting a number of the student station headsets 10. The access to the lower part of the cabinet 52 is not shown in FIGURE 1, but is preferably made through cabinet doors mounted on the backside of the cabinet 52.

The instructor's console comprises a record player 64, a tape recorder 66 adapted to both record and to playback from magnetic tape, an instructor's microphone 68 on a flexible mounting 70, earphone headset 72 connected to the console by a lead 74, a switch panel 76, three antennae 78, 80 and 82, an audio amplifier 84, a radio receiver 86 and three radio transmitters 88, 90 and 92.

The various functional components of the instructor's console are mounted within the console cabinet 52, the exact positioning of which is not critical excepting that ready access be provided to the turntable of the record player or phonograph 64 and the magnetic tape spools of the tape recorder 66. The instructor's console is controlled by a plurality of switches shown generally in FIGURE 1 at 76. FIGURE 2 illustrates the detailed functional relationships between the various components and the switches in the instructor's console.

Signal input to each of the three transmitters 88, 90 and 92 is controlled by switches 94, 96 and 98, respectively. These three switches are four-place selector switches, each of which may connect the respective transmitter alternately to the output of the tape recorder 66, the record player 64, or the instructor's microphone 68; the fourth position is "off." The instructor's earphones may be connected to the receiver 86, which is always tuned to the frequency of the students' transmitters by means of switch 100. A selector switch 102 may further be connected simultaneously to the instructor's earphones at his option to the tape recorder 66, or record player 64, as they are being transmitted. The instructor's earphone volume is controlled by a variable resistance 104. Under the instructor's control at the console, it is provided in this embodiment of our invention that the student record his voice and listen to his spoken words being replayed so that he can more readily judge his own progress and correct his faulty pronunciation. Switches 106 and 108, respectively, connect the receiver 86 to the input terminal of the tape recorder 66 and the transmitters through the selector switches 94, 96 and 98 to the output terminal of the tape recorder 66 adapted for playback. The instructor may monitor the student while the student is recording by closing switch 100. The console microphone 68 may be utilized to record by placing the switch 110 in connect position.

FIGURE 3 shows a preferred circuit for the student station best adapted for the three radio channel systems. The radio receiver 38 comprises an antenna 28, a detection stage 112, which is coupled by conventional means to the output of an oscillator 114. The signal input to the receiver 38 is controlled by the switch 24B, which is one-half of the two-pole switch 24 described above in connection with FIGURE 2. A single stage inductance coupled amplifier 116 forms the output of the radio receiver. The receiver output is fed into the output stage 118 of the audio amplifier 42 which is comprised of two stages. The input stage 120 of the audio amplifier 42 serves as a pre-amplifier for the microphone 32 which couples through the coaxial connection 122.

Volume control in the student's earphones is regulated by the variable resistance 26. The first stage 120 of the audio amplifier 42 is coupled through one-half of the toggle switch 24 as shown at 24A. The transmitter antenna is shown separately in FIGURE 3 at 28A but may be combined with the receiver antenna 28. The power supply 44 controlled by switch 30 is adapted to power, by biasing of a battery 124, the receiver 38, the oscillator 114, the transmitter 40, and the audio amplifier 42. The oscillator 114 is capacitively coupled to the transmitter 40. The oscillator signal is modulated by the output of the amplifier stage 118 of the audio amplifier 42. The input signal to the transmitter is controlled by means of the switch 24A.

The numerous combination settings of the console switches make possible the instructor's supervision of the various members of the class wherein several different learning procedures are being conducted simultaneously. For instance, the students in a portion of the class may be instructed to drill orally by speaking into their respective microphones and opening the switch 24A to their respective transmitters. The instructor may monitor the work of each student by requesting the individual student to close the switch 24A to his transmitter. At all times that the student is not transmitting, his radio receiver is tuned to one of the transmitters in the instructor's console so that the instructor may readily communicate with any particular student. A student may have his voice recorded by switching his transmitter on and having the console switches adjusted so that the receiver output signal in the console is tape recorded. Other students in the class may be assigned to listen to spoken language reproduced by the record player 64 and transmitted through one of the console transmitters. Still another section of the class may be receiving and reciting by means of a third console transmitter under the direct supervision of the instructor.

The transmitters 88, 90 and 92, the receiver 86 and the audio amplifier 84 of the instructor's console are substantially identical in design to that shown in FIGURE 3 for the student's station.

Figure 4:
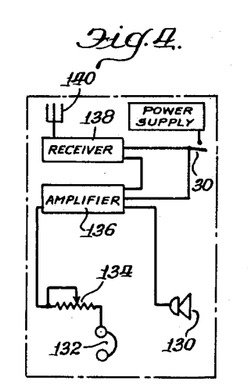
FIGURE 4 is a block diagram of a student station utilized in a second embodiment of our invention particularly adapted to use in grade school instruction.

Another and different embodiment of our invention, best adapted for grade school language instruction, is shown in FIGURE 4. In the elementary grades, the functions of oral drill of lesson material is conveniently conducted by means of a student station comprised of microphone 130, earphones 132 with volume control 134, an audio amplifier 136, and a radio receiver 138 having an antenna 140. The student has no switches and only one control for volume in this more simple student station. The instructor's console comprises essentially the features illustrated in FIGURE 2 for a three channel system excepting the console receiver 86 is now not necessary. This more simplified embodiment of our invention is substantially less expensive to construct, but, in addition, has the advantage of no complex controls to confuse the beginning student. Recording of the student's voice may be accomplished through the console microphone on an individual basis and the playback accomplished through the student's station.

Figure 5:
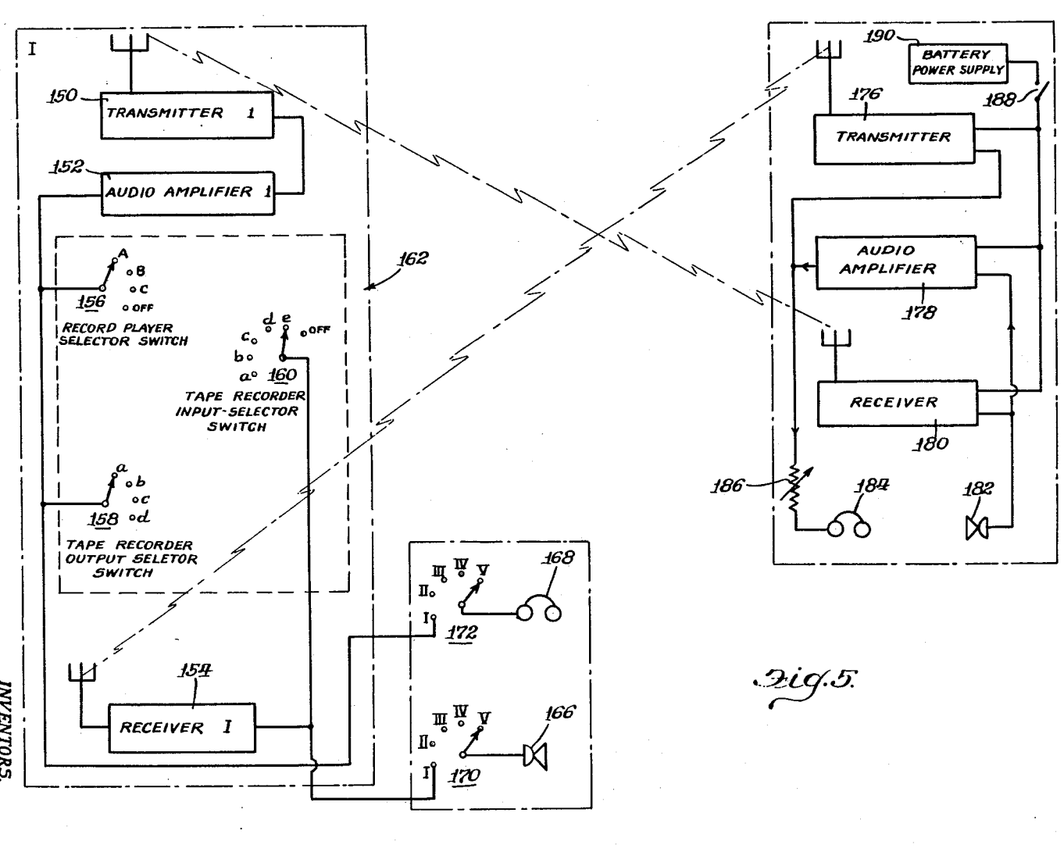
FIGURE 5 is a block diagram illustrating the connections between the component parts and the preferred switching connections for yet another embodiment of our invention which utilizes a sizeable number of radio frequency channels; both the instructor's console and one student station are illustrated.
Figure 6:
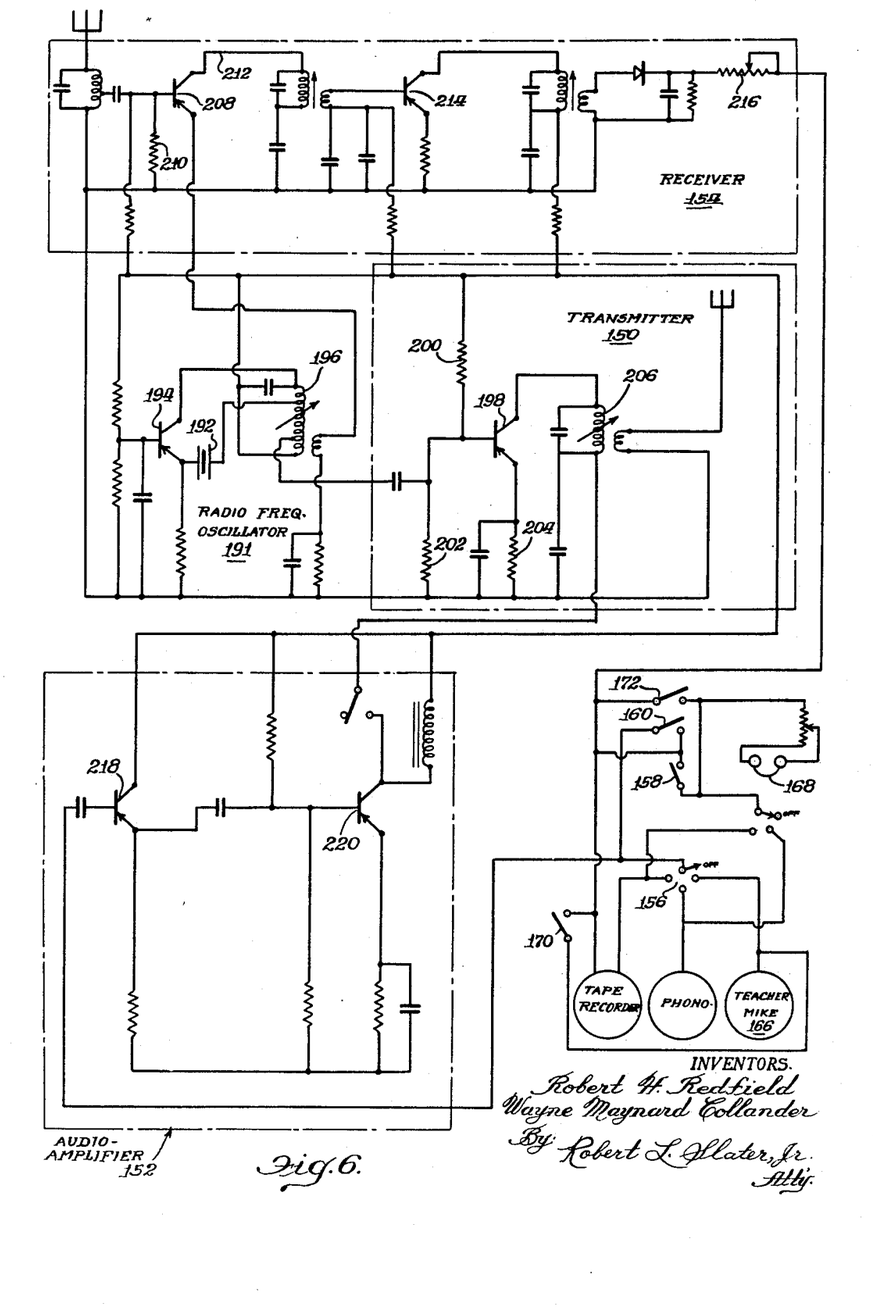
FIGURE 6 is a circuit diagram showing a preferred circuit as used in an instructor's console in an embodiment of our invention such as is illustrated by the block diagram of FIGURE 5.
Figure 7:
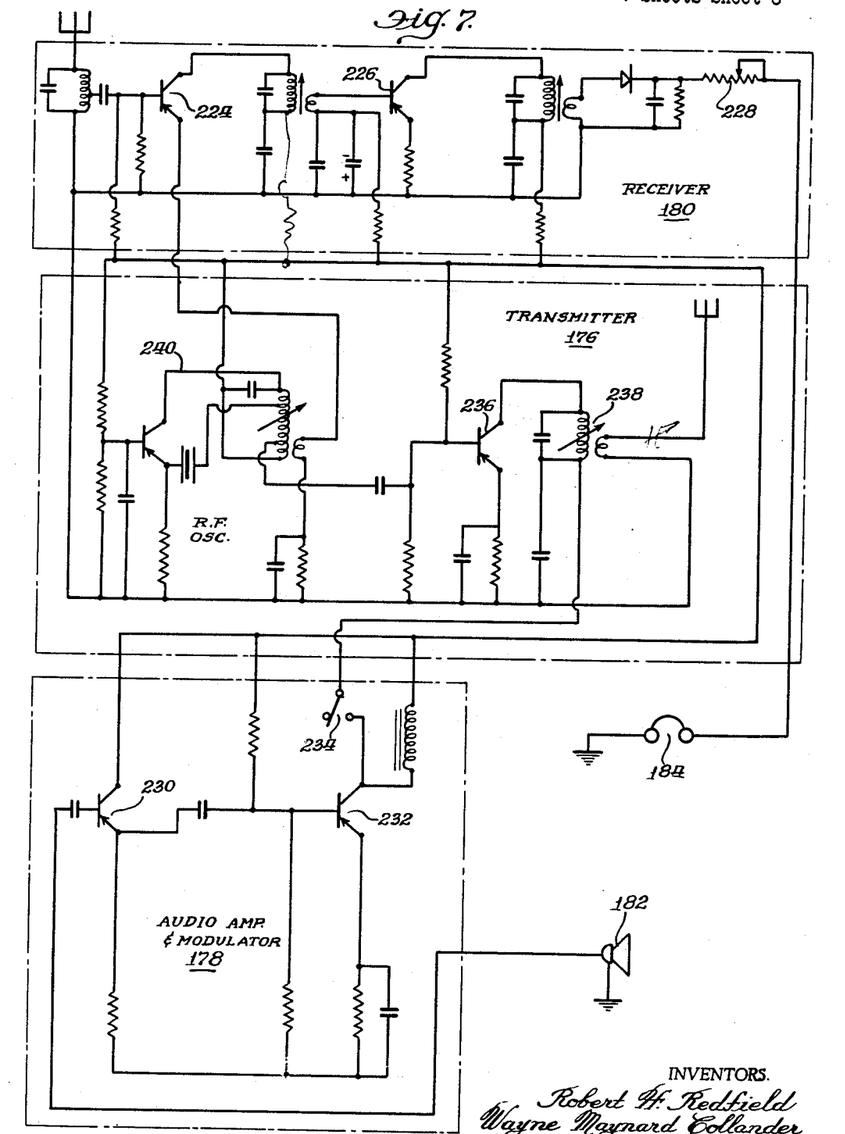
FIGURE 7 is a circuit diagram showing a preferred circuit as used in a student's station in an embodiment of our invention as is illustrated in the block diagram of FIGURE 5.

Still another preferred embodiment of our invention is illustrated in FIGURES 5, 6 and 7. This embodiment utilizes a separate radio channel for each student in the class and upwards of forty or even more radio frequency channels are utilized. FIGURE 5 is a block diagram showing a portion of the instructor's console and, linked by radio, a single student station.

The instructor's console in the many channeled embodiment comprises transmitter 150, an audio amplifier 152, and a receiver 154. One transmitter, one amplifier and one receiver is embodied in the instructor's console for each student station. In addition, the instructor's console is provided with three selector switches for each student station which the console can accommodate. The selector switch 156 is adapted to select the particular record player which may be connected to the input of the audio amplifier 152. The selector switch 158 provides a selection of the output of a selected tape recorder for connection with the audio amplifier and selector switch 160 connected to the output of the receiver 154 selects a tape recorder input circuit for recording the student's spoken words. The instructor's console in the present embodiment provides those functional components indicated generally by box 162. An apparatus to accommodate forty students would, therefore, contain forty units such as indicated in the block diagram 162. A plurality of record players and of tape recorders not shown in the block diagram would be provided also. However, in the interest of economy and for efficiency in the mounting space for the record players and tape recorders, many fewer of these units are required than the total number of student accommodations.

The instructor's console is further provided with a microphone 166 and earphones headset 168, each of which is connected to the console through selector switches 170 and 172, respectively, by which the instructor may select to speak to any one student or all of the students simultaneously or listen to any one of the students through the respective student stations and transceivers tuned to the individual student stations.

The student's station in this embodiment is provided with a transmitter 176, an audio amplifier 178, and a radio receiver 180. In addition, the student station is provided with a microphone 182, an earphone headset 184, and a volume control variable resistor 186. The student station is mounted in a headset such as shown in FIGURE 1 and provided with an off-on switch 188 which controls a battery power supply 190 for powering the transmitter, amplifier, and receiver. In the many channeled embodiment, the student station is much simplified with reference to the adjustments and controls available to the student. His transmitter is at all times operating and his receiver is at all times operating that the switch 188 is in connect position. The student can only adjust the volume in his earphones. With such an arrangement, the instructor can monitor each student individually and the student receives continuously all signals transmitted by the console transmitter in his frequency channel. By such an arrangement, each student is efficiently isolated insofar as his own hearing and his own voice are concerned from his fellow students, but at the instructor's option information may be beamed to the student from the instructor's microphone or from a tape recorder or a record player mounted in the console. The student's oral performance is at all times available to the instructor by making the appropriate adjustments on his selector switches to monitor the student's spoken words.

FIGURES 6 and 7 illustrate preferred circuits adapted for the instructor's console in a many channeled embodiment and the circuit for the student's station in the many channeled embodiment. Referring now to FIGURE 6, one preferred example of a circuit design for the instructor's console is shown. The transmitter 150, the audio amplifier 152, and receiver 154 are indicated by broken line boxes. A crystal radio frequency oscillator indicated generally at 191 is capacitively coupled to the transmitter 150. The oscillator is comprised of a crystal 192, a grounded emitter transistor 194 and a tunable LC circuit 196. The transmitter 150 is comprised of a transistor 198 with bias resistors 200, 202 and 204 and an LC tuned circuit 206. The receiver 154 is comprised of an input stage transistor 208 biased with resistance 210. The transistor 208 emitter is connected to the output of the RF oscillator 191. The collector terminal 212 of the transistor 208 is inductively coupled to the second stage transistor 214 which in turn is inductively coupled through a filter circuit and a volume control 216 to the switching means. The audio amplifier 152 is comprised of a first amplification stage 218 capacitively coupled to a second stage transistor 220. The circuit illustrated in FIGURE 6 is conventional but in the interests of economy of parts and economy of mounting space combines some functions common to two or more sections of the circuit in one common subassembly, such as in the case of the RF oscillator and some of the biasing connections. The power supply for this circuit may be a rectified 110 volt A.C. source; the power supply is conventional and not shown. The numerous switching connections in the instructor's console are best understood by reference to FIGURE 5 where the switching circuits are illustrated in schematic block diagram form. The switching circuits have been described above in connection with FIGURE 5.

Details of a preferred circuit for the student's station in the many channeled embodiment of our invention, portions of which are illustrated in FIGURES 5 and 6, are shown in FIGURE 7. The student station transmitter 176, audio amplifier 178 and receiver 180 are, except for certain switching connections, identical to the respective circuits illustrated and described in connection with the instructor's console in FIGURE 6. The student headphones 184 are connected to the output terminal of the two stage receiver 180. The receiver 180 has two transistors 224 and 226 inductively coupled together in cascade and coupled to an output filter and a volume control variable resistance 228. In FIGURE 5 the volume control is schematically shown at 186. The student microphone 182 is directly coupled to the audio amplifier 178, comprised of two transistors 230 and 232 capacitively coupled in cascade. The student station is provided with a switch 234 controlling input to the student transmitter 176. Switch 234 is not shown in the simplified block diagram of FIGURE 5, but is included in certain embodiments of our invention to permit, when desired, student control of his transmitter output. The transmitter 176 comprises a transistor 236, biased by R and C elements, and an oscillator LC circuit 238. The RF oscillator circuit 240 is identical to that described in FIGURE 6.

Numerous alternative circuits and component subassemblies may be substituted within the scope of our invention for those specific embodiments of the various parts of our invention disclosed and specified herein.

Figure 8:
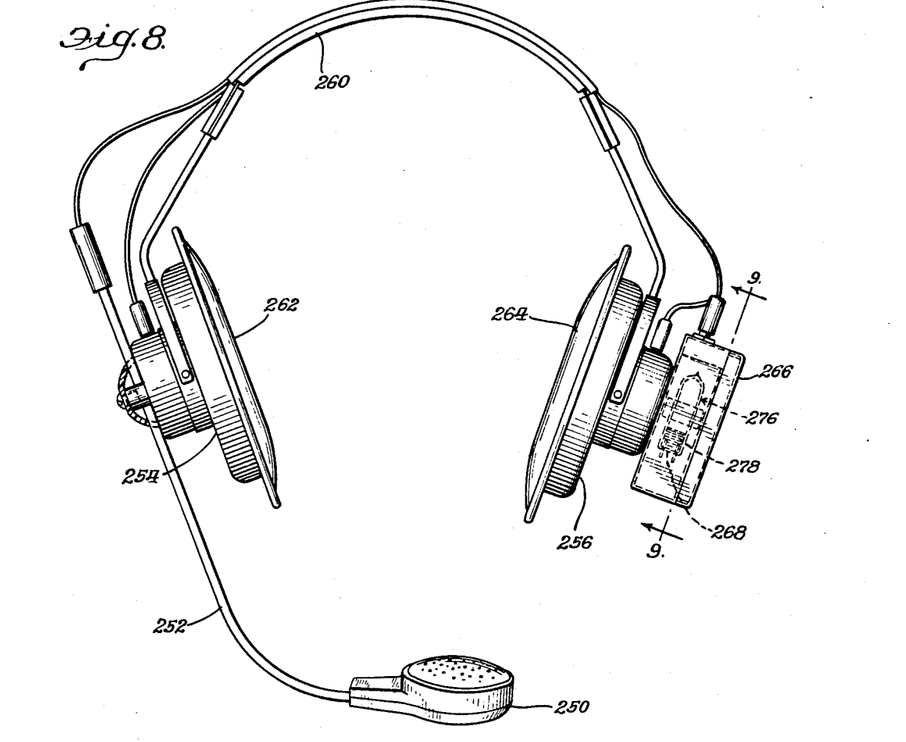
FIGURE 8 is a perspective view of still another embodiment of our invention showing an assembly of a student station such as might be used in preference to the student station shown in FIGURE 1.
Figure 9:
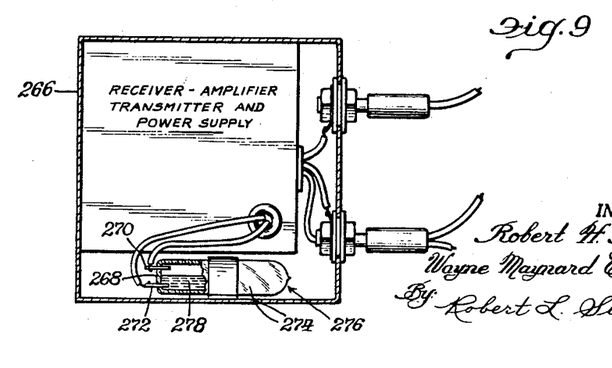
FIGURE 9 is a fragmentary cut-away view of FIGURE 8 taken along the plane of 9—9 showing a switch.

FIGURES 8 and 9 illustrate an alternative embodiment to the student station structure illustrated and described in FIGURE 1. A microphone 250, supported on a lightweight adjustable boom 252, is mounted on the rear face of one earphone of a set 254 and 256. The earphones 254 and 256 are supported on the user's head by means of a headband 260. Ear muffles 262 and 264 cover the user's ears and exclude all sounds not generated in the earphones. A small case 266 mounted on the rear face of earphone 256 contains the transistorized receiver, amplifier, transmitter and power supply such as described above in connection with FIGURES 5 and 7. The switch 268, controlling power to the active circuit members switch 188 as shown in FIGURE 5, is positioned within the container 266. The switch 268 is a mercury switch which opens or closes the circuit in response to position. Two contacts 270 and 272 are mounted in the wall 274 of a sealed cell 276. A small quantity of liquid mercury 278 is placed in the cell. When the cell is held in an erect position, the mercury makes contact with both contacts 270 and 272 as shown in FIGURE 9. When the headset is placed in an upright position on the user's head, the switch 268 closes and the set is powered. When the headset is laid aside and the mercury cell 276 is placed on its side, the switch 268 opens and the active elements in the set are cut off from the power supply.

Our invention may be used in a wide range of radio frequency channels, both AM and FM. We prefer the frequency range of 110 to 130 mc. Each transmitter is then provided with a 50 kc. channel and room for 400 channels is available. Radiated power levels of from one milliwatt to one watt are practical ranges for our device. Normal classroom usage is convenient with 10 milliwatts radiated power in the transmitters.

The foregoing descriptions, illustrations and specifications are intended as merely illustrative, the scope of our invention limited only by the following claims.

We claim:

1. An improved electronic teaching aid comprising in combination a radio link between a plurality of student stations each having a headset of the type including a microphone and earphones, each headset having supportedly mounted thereon and movable therewith means for receiving and transmitting radio signals, means for amplifying audio frequency signals, and electrical connections between the microphone, earphones and means; and an instructor's console having earphones, a microphone, means for transmitting and receiving radio signals, means for recording and reproducing audio frequency sounds, and electrical connections with switches for alternative connections between the various means and the earphones and microphone; whereby a student equipped with one of said headsets may perform repetitious drill, listen to recorded spoken language and receive comments of the instructor, and the instructor positioned at the console may monitor the repetitious drill of each of a plurality of students, record the student's spoken words, and instruct individual students without interrupting the work of the remaining students in the class.

2. An improved electronic teaching aid comprising in combination means for linking by radio a plurality of student stations with an instructor's console wherein each student station comprises a headset of the type including an earphone and a microphone and said headset having supportedly mounted thereon and movable therewith, a radio frequency transmitter physically separate from and operatively cooperable with the wireless radio link, a radio frequency receiver physically separate from and operatively cooperable with the wireless radio link, an amplifier, means for connecting the microphone to the transmitter through the amplifier, and means for connecting the earphone to the receiver through the amplifier, and wherein the instructor's console is provided with earphones, microphone, means to record and play back spoken words, means for receiving and transmitting radio signals, and electrical connections with switches for connecting in alternative circuits the instructor's microphone, earphones and the various means.

3. An improved electronic teaching aid comprising in combination a plurality of student stations linked by radio means to an instructor's console wherein the student station comprises a microphone, earphones on a headset, an audio frequency amplifier, a radio receiver, antenna, battery power supply for both the receiver and the amplifier, and means connecting the microphone and earphones together through the amplifier, and the radio link being connected through the antenna, and the receiver to the audio amplifier; and wherein the instructor's console comprises earphones, a microphone, means for reproducing audio frequency signals, a radio transmitter, electrical leads between the earphones, microphone and means for switching electrical connections between the microphone and reproducing means, and the transmitter.

4. An improved electronic teaching aid comprising an instructor's console having means to record and reproduce human voices, earphones and microphone, a plurality of radio frequency signal transmitters and receivers, and switching means for interconnecting in a plurality of separate circuits the transmitters and receivers with the recorders, the reproducing means, the microphone and the earphones; in combination with a plurality of student stations comprising a headset of the type including an earphone and a microphone, said headset having supportedly mounted thereon and movable therewith, an amplifier, radio frequency signal transmitter, receiver and switching means for interconnecting the students' earphones, microphone, amplifier, transmitter and receiver; the console and the student stations being linked by radio signals between the respective transmitters and receivers.

5. An improved electronic teaching aid comprising in combination a plurality of student stations, an instructor station, and a wireless radio link between each student station and the instructor station, wherein each student station comprises a headset of the type including an earphone and a microphone and said headset having supportedly mounted thereon and movable therewith, a radio frequency transmitter physically separate from and operatively cooperable with the wireless radio link, a radio frequency receiver physically separate from and operatively cooperable with the wireless radio link, an amplifier, means for connecting the microphone to the transmitter through the amplifier, and means for connecting the earphone to the receiver through the amplifier, and the instructor station comprises means for transmitting audio signal intelligence over the radio link, and means for receiving signal intelligence from the radio link and for converting the same to audio signal intelligence.

6. An arrangement in accordance with claim 5 wherein each student station is tuned to a separate radio channel and the instructor station includes, corresponding to each student station, an individually tuned set comprising a transmitter, receiver, and amplifier and means for selecting any of said sets.

7. An arrangement in accordance with claim 5 wherein in each student headset means permanently connect the microphone to supply input to the amplifier and means permanently connect the earphone to receive output from the amplifier.

8. An arrangement in accordance with claim 6 wherein in each student headset means permanently connect the microphone to supply input to the amplifier and means permanently connect the earphone to receive output from the amplifier.

9. An improved electronic teaching aid comprising in combination a plurality of student stations, an instructor station, and a wireless radio link between each student station and the instructor station, wherein each student station comprises a headset including earphones, each equipped with sound isolating facilities, and a microphone, and said headset having supportedly mounted thereon and movable therewith, a radio frequency transmitter physically separate from and operatively cooperable with the wireless radio link, a radio frequency receiver physically separate from and operatively cooperable with the wireless radio link, an amplifier, means for connecting the microphone to the transmitter through the amplifier, and means for connecting the earphone to the receiver through the amplifier, and the instructor station comprises means for transmitting audio signal intelligence over the radio link, and means for receiving signal intelligence from the radio link and for converting the same to audio signal intelligence, each transmitter having a radiated power on the order of 10 milliwatts.

References Cited in the file of this patent
UNITED STATES PATENTS 2,678,999 Norris ______________ May 18, 1954

OTHER REFERENCES

1959 Brochure, "Sound Teaching with Magneticon," Model 66 Synchro-Magneticon Magnetic Recording Industries, 126 Fifth Ave., New York 11, N.Y.

Sands: "Person-to-Person Communications," Radio and Television News, June 1956, pp. 35–38, 141–144.